(12) United States Patent
Li et al.

(10) Patent No.: US 10,684,787 B1
(45) Date of Patent: Jun. 16, 2020

(54) PARTITION SPLITTING METHOD AND APPARATUS, ELECTRONIC DEVICE, AND READABLE STORAGE MEDIUM

(71) Applicant: Alibaba Group Holding Limited, George Town (KY)

(72) Inventors: Chenxi Li, Hangzhou (CN); Yuzhong Zhao, Hangzhou (CN); Hu Xu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/698,227

(22) Filed: Nov. 27, 2019

(30) Foreign Application Priority Data

Jan. 28, 2019 (CN) .......................... 2019 1 0080122

(51) Int. Cl.
*G06F 3/06* (2006.01)
*G06F 16/31* (2019.01)

(52) U.S. Cl.
CPC ............ *G06F 3/0644* (2013.01); *G06F 3/064* (2013.01); *G06F 3/0614* (2013.01); *G06F 3/0659* (2013.01); *G06F 3/0673* (2013.01); *G06F 16/322* (2019.01)

(58) Field of Classification Search
USPC ........................................................ 707/609
See application file for complete search history.

(56) References Cited

U.S. PATENT DOCUMENTS

| | | | | |
|---|---|---|---|---|
| 7,085,936 | B1 * | 8/2006 | Moran ................. | G06F 21/552 726/5 |
| 7,174,343 | B2 * | 2/2007 | Campos ............... | G06K 9/6223 707/737 |
| 7,423,656 | B2 * | 9/2008 | Zhao .................... | G06T 3/0093 345/420 |
| 7,533,363 | B2 * | 5/2009 | Zhang .................. | G06F 30/39 716/55 |
| 7,958,096 | B2 * | 6/2011 | Perrizo ................ | G06K 9/6282 707/693 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Cam Linh T Nguyen
(74) *Attorney, Agent, or Firm* — Fish & Richardson P.C.

(57) ABSTRACT

Implementations of the present application provide a partition splitting method. Data files in a target source partition are divided into at least two data groups. A first data group from the at least two data groups is selected as a target splitting data group. A first splitting step is performed on the target splitting data group, including: splitting the target splitting data group into a plurality of data sub-groups based on a predetermined splitting rule, wherein each data sub-group of the plurality of data sub-groups corresponds to a new partition of at least two new partitions for the target source partition, and assigning each data sub-group to the new partition corresponding to the data sub-group. A second data group from the at least two data groups is selected as the target splitting data group, wherein the second data group is different from the first data group.

24 Claims, 7 Drawing Sheets

(56) References Cited

U.S. PATENT DOCUMENTS 9,641,615 B1 * 5/2017 Robins ................ H04L 67/1097

OTHER PUBLICATIONS

Nakamoto, "Bitcoin: A Peer-to-Peer Electronic Cash System," www.bitcoin.org, 2005, 9 pages.
it.toolbox.com [online], "SQL Split Comma String into Multiple Columns," Feb. 2014, retrieved on Apr. 24, 2020, retrieved from URL<https://it.toolbox.com/question/sql-split-comma-string-into-multiple-columns-061113>, 12 pages.
PCT International Search Report and Written Opinion in International Application No. PCT/US2020/015472, dated Apr. 24, 2020, 13 pages.

* cited by examiner

PARTITION SPLITTING METHOD AND APPARATUS, ELECTRONIC DEVICE, AND READABLE STORAGE MEDIUM

CROSS-REFERENCE TO RELATED APPLICATIONS

This application claims priority to Chinese Patent Application No. 201910080122.9, filed on Jan. 28, 2019, which is hereby incorporated by reference in its entirety.

TECHNICAL FIELD

Implementations of the present application relate to the field of database technologies, and in particular, to a partition splitting method and apparatus, an electronic device, and a readable storage medium.

BACKGROUND

A database partition is a physical database design technology. When a data volume of a single partition is excessively large, the partition needs to be split. Partition splitting is to split one partition into a plurality of partitions, and then bring an original partition offline to make new partitions online, so that write/read pressure of the original partition can be distributed to different partitions, thereby breaking through a limit of a processing capability of a single partition. However, because a single partition in some databases is oversized, a large quantity of CPU resources, IO resources, disk space resources, etc. need to be consumed during the partition splitting.

SUMMARY

Implementations of the present application provide a partition splitting method and apparatus, an electronic device, and a readable storage medium.

According to a first aspect, an implementation of the present application provides a partition splitting method, including: creating at least two new partitions for a target source partition, and dividing data files in the target source partition into at least two data groups, selecting one data group from the at least two data groups as a target splitting data group to perform a splitting step on the target splitting data group, and after the target splitting data group is split, selecting, as a target splitting data group, another data group from data groups other than the data group that has already been split, until the at least two data groups are all split, where the splitting step includes: splitting the target splitting data group into a plurality of data sub-groups based on a predetermined splitting rule, where each data sub-group corresponds to one new partition, and assigning each data sub-group to the new partition corresponding to the data sub-group.

According to a second aspect, an implementation of the present application provides a partition splitting method, applied to a database system using a log-structured merge (LSM) tree, and including: creating at least two new partitions for a target source partition, where a first data file is stored in the target source partition, and the first data file is a data file whose data volume exceeds a predetermined value, and performing a first splitting step on the first data file to split the first data file into the at least two new partitions, where the first splitting step includes: dividing the first data file into at least two first data groups, and selecting one first data group from the at least two first data groups as a target splitting data group, splitting the target splitting data group into a plurality of second data groups based on a predetermined splitting rule, where each second data group corresponds to one new partition, assigning each second data group to the new partition corresponding to the second data group, and performing merging processing on target data in the new partition, and selecting, as a target splitting data group, another first data group from first data groups other than the first data group that has already been split, until the at least two first data groups are all split.

According to a third aspect, an implementation of the present application provides a partition splitting apparatus, including: a first creation module, configured to create at least two new partitions for a target source partition, and a first splitting module, configured to divide data files in the target source partition into at least two data groups, select one data group from the at least two data groups as a target splitting data group to perform a splitting step on the target splitting data group, and after the target splitting data group is split, select, as a target splitting data group, another data group from data groups other than the data group that has already been split, until the at least two data groups are all split, where the splitting step includes: splitting the target splitting data group into a plurality of data sub-groups based on a predetermined splitting rule, where each data sub-group corresponds to one new partition, and assigning each data sub-group to the new partition corresponding to the data sub-group.

According to a fourth aspect, an implementation of the present application provides a partition splitting apparatus, applied to a database system using an LSM tree, and including: a second creation module, configured to create at least two new partitions for a target source partition, where a first data file is stored in the target source partition, and the first data file is a data file whose data volume exceeds a predetermined value, and a second splitting module, configured to perform a first splitting step on the first data file to split the first data file into the at least two new partitions, where the first splitting step includes: dividing the first data file into at least two first data groups, and selecting one first data group from the at least two first data groups as a target splitting data group, splitting the target splitting data group into a plurality of second data groups based on a predetermined splitting rule, where each second data group corresponds to one new partition, assigning each second data group to the new partition corresponding to the second data group, and performing merging processing on target data in the new partition, and selecting, as a target splitting data group, another first data group from first data groups other than the first data group that has already been split, until the at least two first data groups are all split.

According to a fifth aspect, an implementation of the present application provides an electronic device, including: a memory, one or more processors, and the partition splitting apparatus provided in the third aspect or the partition splitting apparatus provided in the fourth aspect, where the apparatus is stored in the memory and is configured to be executed by the one or more processors.

According to a sixth aspect, an implementation of the present application provides a computer-readable storage medium, where the computer-readable storage medium stores a computer program, and the program is executed by a processor to implement the steps of the partition splitting method provided in the first aspect or the partition splitting method provided in the second aspect.

Beneficial effects of the implementations of the present application are as follows:

In the partition splitting method provided in the implementations of the present application, data files in a target source partition are divided into at least two data groups. One of the data groups is first used as a target splitting data group, and the target splitting data group is split into a plurality of data sub-groups based on a predetermined splitting rule and the data sub-group is assigned to a corresponding new partition. After the target splitting data group is split, another data group is selected from remaining data groups as a target splitting data group. Splitting is performed in a plurality of rounds, until all the data groups are split. As such, a partition is split in a plurality of rounds, and resource consumption of partition splitting is distributed to a plurality of time periods, thereby effectively saving CPU resources, IO resources, disk space resources, etc. that are occupied in the same time period in a splitting process, and improving splitting performance.

DESCRIPTION OF IMPLEMENTATIONS

To facilitate better understanding of the previous technical solutions, the following describes in detail the technical solutions in the implementations of the present application by using the accompanying drawings and specific implementations. It should be understood that the implementations of the present application and a specific feature in the implementations are detailed descriptions of the technical solutions in the implementations of the present application, and are not intended to limit the technical solutions in the present application. The implementations of the present application and the specific feature in the implementations can be combined if they do not conflict with each other. It is worthwhile to note that in the implementations of the present application, the term "at least two" means two or more than two, and the term "and/or" is only an association relationship for describing associated objects, and represents that three relationships can exist. For example, M and/or N can represent the following three cases: Only M exists, both M and N exist, and only N exists.

In the implementations of the present application, partition splitting enables a partition to become a plurality of new partitions, so that data in an original partition is allocated to the plurality of new partitions based on a predetermined splitting rule, and is owned by the new partitions, thereby alleviating a problem that access of a partition exceeds a processing capability of a single machine (storage server). In addition, there can be a plurality of partition splitting methods, for example, range splitting or hash splitting can be used. Range splitting means dividing data in an original partition into several non-repeated ranges, and assigning the data to a corresponding new partition, without re-dividing each piece of row data. Hash splitting means dividing data based on a hash value of data in an original partition, and re-allocating the data after a hash value of each piece of row data needs to be obtained.

It is worthwhile to note that the partition splitting method provided in the implementations of the present application is applied to a database system, and can be executed by a storage device or a management device in the database system, for example, can be executed by a storage server in the database system.

Figure 1:
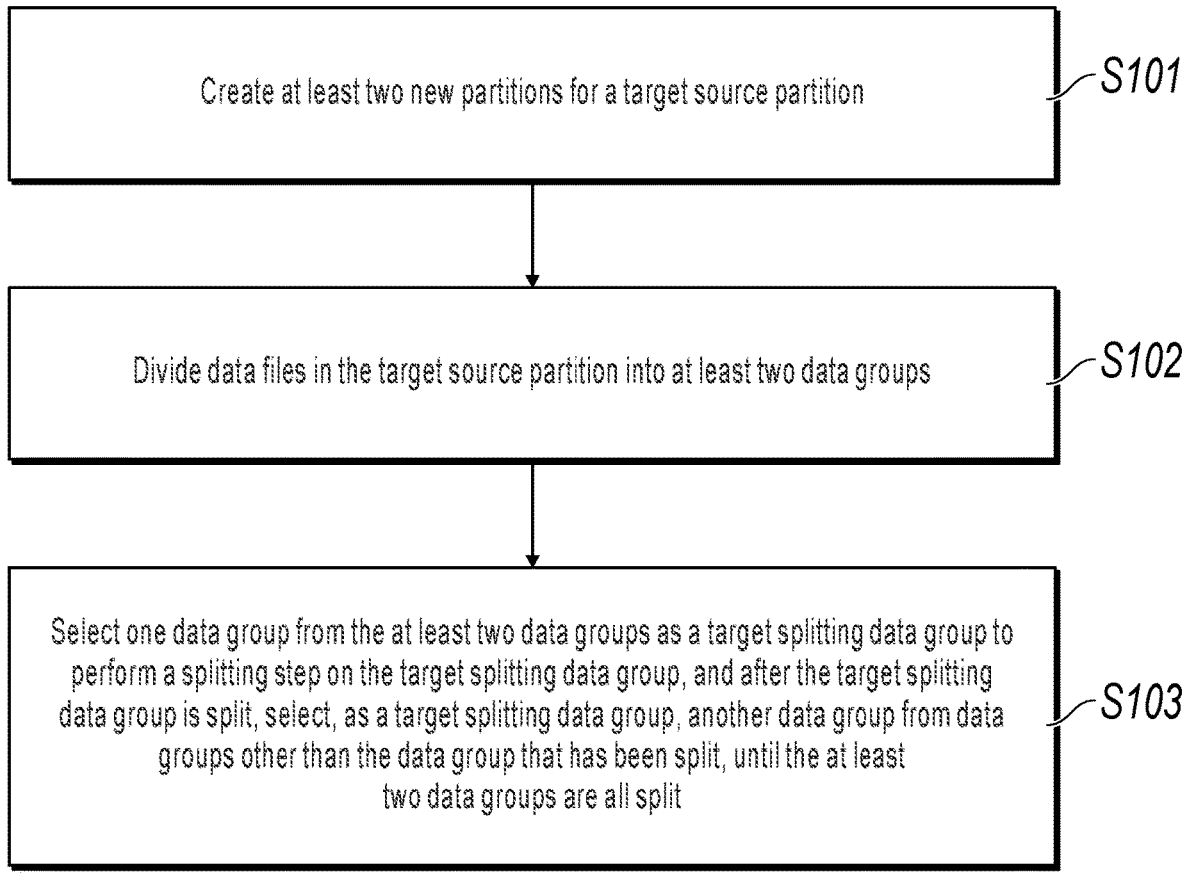
FIG. 1 is a flowchart illustrating a partition splitting method, according to a first aspect of the implementations of the present application.

According to a first aspect, an implementation of the present application provides a partition splitting method. As shown in FIG. 1, the method includes step S101 to step S103.

Step 101. Create at least two new partitions for a target source partition.

In this implementation, a partition that satisfies a predetermined splitting condition in a database can be used as a target source partition based on a specific storage demand of the database, and at least two new partitions are created for the target source partition, so as to split the partition. A quantity of new partitions correspondingly created for each target source partition can be set based on an actual demand, for example, 2, 5, 10, or 100. For example, when target source partition F needs to be split into two partitions, two new partitions F1 and F2 need to be created for target source partition F.

Step S102. Divide data files in the target source partition into at least two data groups.

In this implementation, the data file is a physical file, and is a real file that actually exists in a partition, that is, is a data file that is written and stored into a partition after the partition is created. For example, in a database where data is stored in a key-value format, a data file includes a key and a value, where the key and the value are logically in a one-to-one relationship, the key is equivalent to an index of the data file, and the value is a value corresponding to the key.

Specifically, a quantity of data groups that the data files in the target source partition need to divide can be preconfigured based on an actual demand, for example, can be preconfigured by a user, or can be preconfigured by a server based on a resource occupation status. The to-be-divided data group quantity decides the to-be-split rounds in the following step S103.

Step S103. Select one data group from the at least two data groups as a target splitting data group to perform a splitting step on the target splitting data group, and after the target splitting data group is split, select, as a target splitting data group, another data group from data groups other than the data group that has already been split, until the at least two data groups are all split.

The splitting step in step S103 can include: splitting the target splitting data group into a plurality of data sub-groups based on a predetermined splitting rule, where each data sub-group corresponds to one new partition, and assigning each data sub-group to the new partition corresponding to the data sub-group. It is worthwhile to note that a quantity of data sub-groups is the same as a quantity of new partitions created in step S101.

In this implementation, the splitting rule can be set in advance based on an actual demand and a predetermined splitting method. For example, when range splitting is used, the splitting rule can be used to divide the target splitting data group into several non-repeated ranges and assign data in each range to a corresponding new partition. When hash splitting is used, the splitting rule can be used to split data in the target splitting data group based on a value returned from an expression defined by a user. The expression can be set based on an actual demand. For example, when the data in the target splitting data group is row data, each piece of row data includes two columns, where one column is a primary key, and the other column is a value corresponding to the primary key. The splitting rule can be: key %2, that is, obtaining a remainder by dividing the primary key by 2. Assume that the target source partition needs to be split into two new partitions. In this case, row data whose return value is an odd number can be assigned to one new partition, and row data whose return value is an even number can be assigned to the other new partition. Certainly, in addition to the previous two splitting methods, another splitting method can be used.

For example, assume that target source partition F needs to be split into two new partitions F1 and F2, and data files A, B, C, and D are stored in target source partition F. Assume that the data files are divided into four data groups, and one file is used as one data group. In actual applications, the data groups can be successively split in four rounds based on a data storage sequence. That is, file A is first used as a target splitting data group, file A is split into data sub-group A1 and data sub-group A2 based on the predetermined splitting rule, data sub-group A1 is assigned to new partition F1, and data sub-group A2 is assigned to new partition F2. After file A is split, file B is used as a target splitting data group again, file B is split into data sub-group B1 and data sub-group B2 based on the previous splitting rule, data sub-group B1 is assigned to new partition F1, and data sub-group B2 is assigned to new partition F2. After file B is split, file C is used as a target splitting data group again, file C is split into data sub-group C1 and data sub-group C2 based on the previous splitting rule, data sub-group C1 is assigned to new partition F1, and data sub-group C2 is assigned to new partition F2. After file C is split, file D is split into data sub-group D1 and data sub-group D2 based on the previous splitting rule, data sub-group D1 is assigned to new partition F1, and data sub-group D2 is assigned to new partition F2. As such, data in the target source partition is split.

In this implementation, data stored in the target source partition is split in a plurality of rounds by using a progressive splitting method, and only a part of data stored in the target source partition is split in each round. Therefore, resource consumption of partition splitting is distributed to a plurality of time periods, thereby effectively saving CPU resources, IO resources, disk space resources, etc. that are occupied in the same time period in a splitting process.

In addition, in an implementation of the present application, to further save resources consumed in the partition splitting process, in the progressive splitting process described in step S103, after each round of splitting is completed, that is, for a current target splitting data group, after each data sub-group is assigned to a new partition corresponding to the data sub-group, the method can further include: deleting a target splitting data group that is split from the target source partition, so that space resources occupied by this part of data can be released in the partition splitting process, thereby saving disk space resources.

For example, in the previous example, in the partition splitting process, after file A is split, file A can be deleted from the target source partition, after file B is split, file B can be deleted from the target source partition, after file C is split, file C can be deleted from the target source partition, and after file D is split, file D can be deleted from the target source partition. There is no need to delete the data files in the target source partition after the data in the target source partition is all split, thereby effectively saving disk space resources.

In this implementation, step S102 and step S103 are a process of performing physical splitting for a new partition. It can be understood that, to help the user normally perform a query operation in the partition splitting process, in an implementation of the present application, before physical splitting is performed for a new partition, logical splitting further needs to be performed. That is, before the dividing data files in the target source partition into at least two data groups, and selecting one data group from the at least two data groups as a target splitting data group to perform a splitting step on the target splitting data group, the method can further include: creating a reference file in each new partition for a data file stored in the target source partition, where the reference file is used to reference the data file.

It is worthwhile to note that the reference file is a logical file and is used to point to a data file referenced in the target source partition. In this implementation, a corresponding reference file is created for each data file stored in the target source partition. For example, in the previous example, data files A, B, C, and D are stored in target source partition F. In this case, reference files pointing to A, B, C, and D need to be generated in each of new partitions F1 and F2 created for target source partition F. For example, reference files a1, b1, c1, and d1 are generated in new partition F1, and reference files a2, b2, c2, and d2 are generated in new partition F2. Both a1 and a2 point to data file A, both b1 and b2 point to data file B, both c1 and c2 point to data file C, and both d1 and d2 point to data file D.

In this case, after the assigning each data sub-group to the new partition corresponding to the data sub-group, the method further includes: deleting the reference file from the new partition after data corresponding to the reference file is all split. As such, space resources occupied by the reference file can be released accordingly. For example, in the previous example, after data file A is split, reference file a1 generated in new partition F1 and reference file a2 generated in new partition F2 can be deleted.

It is worthwhile to note that, after logical splitting is completed for a new partition and before physical splitting is performed for the new partition, when a query request of the user is received and some data in the new partition needs to be queried, a data file referenced by the new partition and data newly written into the new partition are queried based on the query request. Because at this time the new partition references data file in a corresponding target source partition, data that does not belong to the new partition can be identified. Therefore, the identified data needs to be filtered based on the predetermined splitting rule, data identified from the data newly written into the new partition is merged with data obtained through filtering, and a result obtained through merging is fed back to the user.

For example, in the previous example, the data file stored in the target source partition includes a plurality of row data, and each piece of row data includes two columns, where one column is a primary key, and the other column is a value corresponding to the primary key. The splitting rule can be: key %2, data whose value returned from the expression is an odd number is assigned to new partition F1, and data whose value returned from the expression is an even number is assigned to new partition F2. When the user needs to query data whose value is 1 in new partition F1, the user first queries a referenced data file based on the query request. For example, identified data includes (1, 1) and (2, 1). In this case, the user filters out, based on the splitting rule, data (2, 1) that does not belong to new partition F1, to obtain data (1, 1).

In the partition splitting method provided in this implementation of the present application, a partition is split in a plurality of rounds, and resource consumption of partition splitting is distributed to a plurality of time periods, thereby effectively saving CPU resources, IO resources, disk space resources, etc. that are occupied in the same time period in a splitting process, and improving splitting performance. In addition, an application range is wide, and the method can be applied to a plurality of types of partitions, such as a range partition, a hash partition, and a list partition.

According to a second aspect, an implementation of the present application further provides a partition splitting method, applied to a database system using a log-structured merge (LSM). For example, the method can be applied to an OceanBase database, an Oracle database, or a MySQL database. The following mainly uses the OceanBase database as an example to describe the partition splitting method provided in this implementation. It is worthwhile to note that a part that is the same or similar to that in the implementation provided in the first aspect is not described in detail in this implementation. For details, references can be made to the corresponding descriptions in the first aspect.

Figure 2:
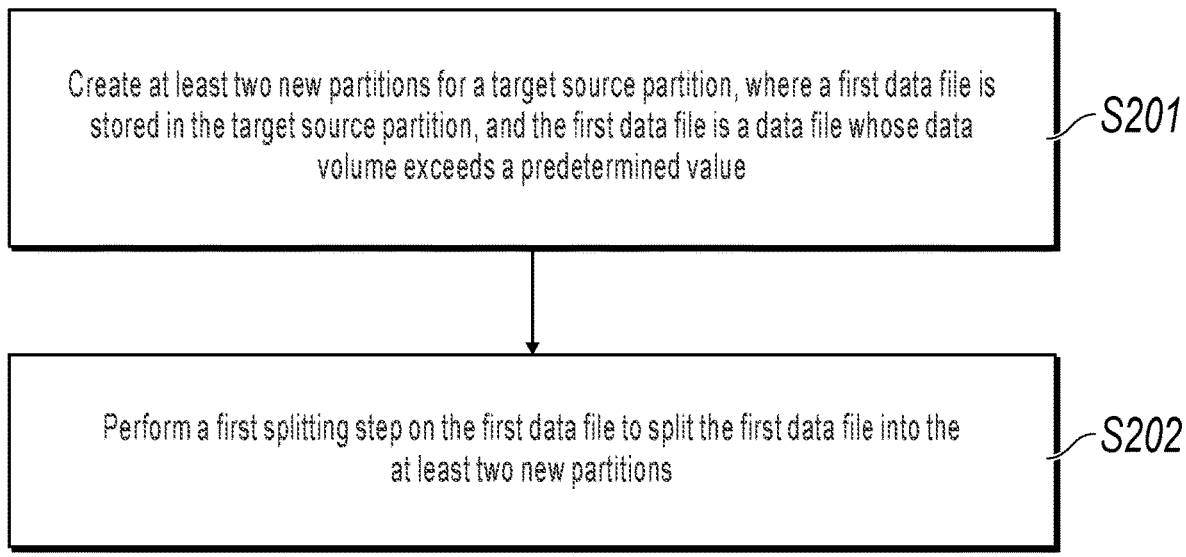
FIG. 2 is a flowchart illustrating a partition splitting method, according to a second aspect of the implementations of the present application.

As shown in FIG. 2, the partition splitting method provided in this implementation can include at least the following step S201 and step S202.

Step S201. Create at least two new partitions for a target source partition, where a first data file is stored in the target source partition, and the first data file is a data file whose data volume exceeds a predetermined value.

It is worthwhile to note that the LSM tree is a data storage structure including a plurality of independent data structures. A partition in a database using the LSM tree structure usually includes a plurality of static sstables, a plurality of frozen memtables, and one active memtable. Data in the partition in the database using the LSM tree structure needs to be periodically merged to release memory. After partition splitting is introduced, a large quantity of resources are consumed by the two operations, and an online service can be seriously affected. Therefore, a splitting occasion and a merging occasion need to be coordinated.

The OceanBase database is used as an example. The active memtable is a memory data structure in the LSM tree, and is responsible for writing new data. The frozen memtable is obtained by freezing the active memtable, and no new data can be written. The static sstable includes a dump sstable and a baseline sstable. The dump sstable is a data structure in the LSM tree that is persisted on a disk, is obtained by dumping the frozen memtable and the dump sstable, includes a plurality of macroblocks, and has a relatively small data volume. The baseline sstable is a data structure in the LSM tree that is persisted on a disk, is obtained by merging a plurality of dump sstables and a plurality of baseline sstables, includes a plurality of macroblocks, has a data volume far greater than a data volume of the memtable and a data volume of the dump sstable, and has a data format slightly different from a data format of the dump sstable. Each macroblock includes a plurality of rows of sorted data, has a size of a fixed value, for example, can be 2 M, is persisted on a disk, and is a basic composition unit of the sstable.

It can be understood that in this implementation of the present application, freezing means that after dynamic data, that is, an active memtable, is updated for a specific time or has a data volume reaching a specific scale, the database stops modifying the dynamic data block, and during subsequent update, a new dynamic data block, that is, a new active memtable, is written, and the old dynamic data block is not modified any more. Dump is a process where a frozen dynamic data block, that is, the previous frozen memtable, is persisted (is converted into a dump sstable and stored on a solid state disk (SSD) or a disk) for a reason such as memory saving or persistence. Merging is a process of merging one or more dump sstables and one or more baseline sstables to generate a new baseline sstable.

In addition, it is worthwhile to note that, after the new partitions are created for the target source partition, an active memtable in the target source partition needs to be frozen, and a write operation is performed on an active memtable in the new partition after the freezing.

In this implementation, there are a plurality of types of data structures in the target source partition, and a data file whose data volume exceeds the predetermined value in the target source partition is used as the first data file. The predetermined value can be set based on an actual demand. The OceanBase database is used as an example. The data volume of the baseline sstable is far greater than the data volume of the memtable and the data volume of the dump sstable. Therefore, in an implementation method of the implementation, a baseline sstable file in the target source partition can be used as the first data file, that is, the following first splitting step is performed on the baseline sstable file. It is worthwhile to note that in another implementation of the present application, a data block or a data file of another data structure can be used as the first data file. For example, the baseline sstable and the dump sstable each can be used as the first data file, so that progressive splitting is performed on each of the baseline sstable and the dump sstable in a plurality of rounds. No limitation is imposed here.

Step S202. Perform a first splitting step on the first data file to split the first data file into the at least two new partitions.

Figure 3:
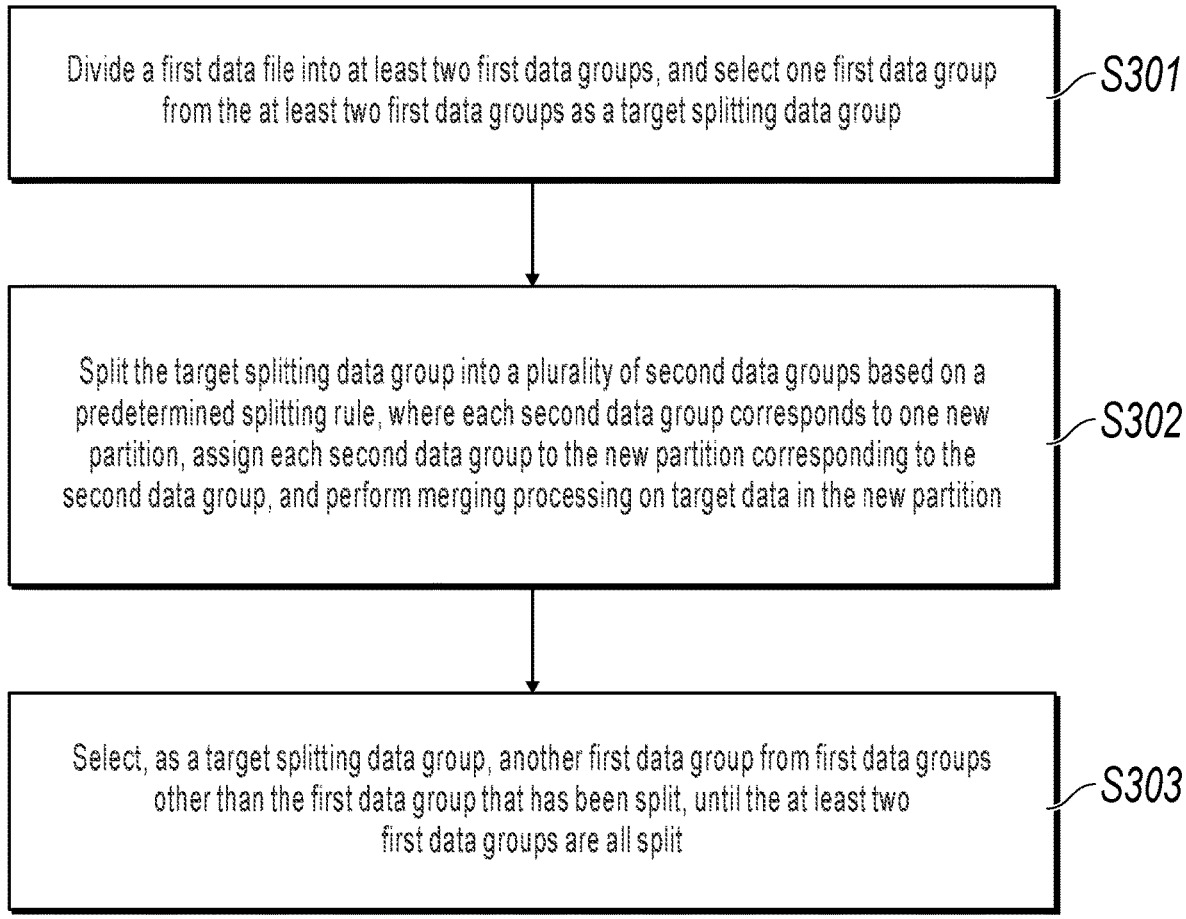
FIG. 3 is a step flowchart illustrating a first splitting step, according to a second aspect of the implementations of the present application.

As shown in FIG. 3, the previous first splitting step can include the following steps S301 to S303.

Step S301. Divide the first data file into at least two first data groups, and select one first data group from the at least two first data groups as a target splitting data group.

Step S302. Split the target splitting data group into a plurality of second data groups based on a predetermined splitting rule, where each second data group corresponds to one new partition, assign each second data group to the new partition corresponding to the second data group, and perform merging processing on target data in the new partition.

Step S303. Select, as a target splitting data group, another first data group from first data groups other than the first data group that has already been split, until the at least two first data groups are all split.

The first splitting step in this implementation is similar to the splitting step in the implementation provided in the first aspect. A difference lies in that in the first splitting step, after the target splitting data group is split in each round, that is, after each second data group is assigned to the new partition corresponding to the second data group, merging processing further needs to be performed on the target data in the new partition, that is, when the new partition satisfies a predetermined merging condition, the target data is merged to obtain a target file. It is worthwhile to note that, for a part of the first splitting step similar to the splitting step in the implementation provided in the first aspect, references can be made to the corresponding descriptions in the first aspect, and details are omitted here for simplicity.

To further save resources consumed in a partition splitting process, in the progressive splitting process described in step S302, after each round of splitting is completed, that is, for a current target splitting data group, after each second data group is assigned to a new partition corresponding to the second data group, the method can further include: deleting a target splitting data group that is split from the target source partition. For a specific process, references can be made to the corresponding process in the first aspect. As such, space resources occupied by this part of data can be released in the partition splitting process, thereby saving disk space resources.

It can be understood that in the LSM-based database system, as data writing increases, a quantity of dump increases as well, as such, a quantity of dump sstables also increases. However, excessive sstables can cause an increase of IO data query. Therefore, these sstables need to be continuously merged. In this implementation, the target data includes baseline data and dump data in the new partition, that is, a baseline sstable and a dump sstable.

In this implementation, a progressive splitting method for completing splitting in many rounds is used for the first data file. Therefore, when the first data file is a baseline data file, that is, the baseline sstable file in the target source partition, the baseline data in the target data can include: data obtained by splitting a current target splitting data group, that is, baseline data obtained in a current round of splitting, and data obtained by splitting a previous target splitting data group and through merging, that is, a target file obtained in a previous round of splitting and through merging. It is worthwhile to note that, if a current splitting process is the first round of splitting the first data file, there is no data obtained by splitting the previous target splitting data group and through merging, that is, there is no target file obtained in the previous round. In this case, the baseline data in the target data includes: data obtained by splitting the current target splitting data group, that is, baseline data obtained in the current round of splitting, so that the data obtained by splitting the current target splitting data group and the dump data, that is, the dump sstable in the new partition, are merged.

The dump data in the target data includes data obtained by splitting a dump data file in the target source partition and/or data obtained by performing freezing and dump processing on new data written into the new partition. It can be understood that, in the process of splitting the target source partition, after the new partitions corresponding to the target source partition are created and the active memtable in the target source partition is frozen, a write operation is performed on the active memtable in the new partition. After the active memtable in the new partition is updated for a certain time or has a data volume reaching a certain scale, the active memtable becomes a frozen memtable, and is then dumped to form a dump sstable.

The OceanBase database is used as an example. When the first data file is a baseline sstable file, because the baseline sstable includes a plurality of macroblocks, a macroblock to be split in a current round is obtained based on a preconfigured quantity of rounds of progressive splitting, and the macroblock to be split in the current round is split based on the predetermined splitting rule. If hash splitting is used, a hash value is obtained by iterating each piece of row data in the macroblock to be split based on the previous splitting rule, and is put into a corresponding sstable. If range splitting is used, only data in a macroblock at a partition boundary needs to be iterated. A macroblock that does not need to be iterated can be directly put into a corresponding sstable, and then an organized baseline sstable is assigned to a corresponding new partition to complete data splitting in the current round.

After each round of data splitting is completed, the target data in the new partition needs to be merged. A baseline sstable obtained in the current round of splitting, a baseline sstable obtained in the previous round of splitting and through merging, and a dump sstable is merged into a new baseline sstable.

Figure 4:
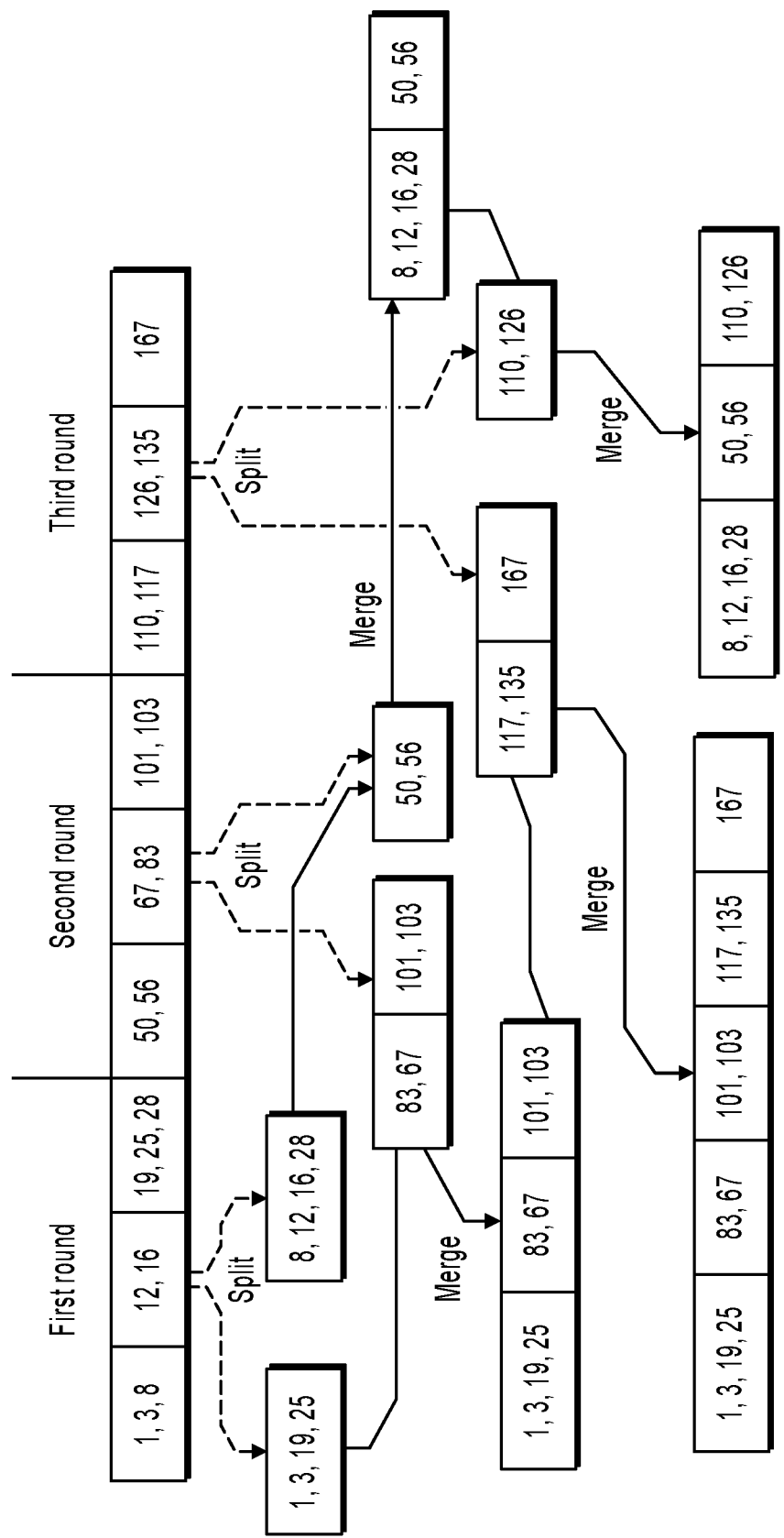
FIG. 4 is a diagram illustrating an example of a simplified model of progressive splitting, according to a second aspect of the implementations of the present application.

For example, FIG. 4 shows an example of a simplified model of progressive splitting of a baseline sstable. In this example, assume that the target source partition needs to be split into two new partitions F1 and F2, the splitting rule is: primary key %2, and there is no other baseline sstables, dump sstables, and memtables. In FIG. 4, each rectangular box represents a macroblock, a number in each rectangular box represents a primary key of each piece of row data in the macroblock, a dotted line with an arrow represents splitting, and a solid line with an arrow represents merging. As shown in FIG. 4, the baseline sstable is split in three rounds, target splitting data groups in the first round include the first three macroblocks, target splitting data groups in the second round include the intermediate three macroblocks, and target splitting data groups in the third round include the last three macroblocks. A specific splitting process is as follows:

In the first round of splitting process, based on the splitting rule, a second data group "1, 3, 19, 25" obtained after splitting is assigned to new partition F1, and a second data group "8, 12, 16, 28" is assigned to new partition F2. Assume that the merging condition is not satisfied. The second round of splitting process is directly performed.

In the second round of splitting process, based on the splitting rule, a second data group "83, 67, 101, 103" obtained after splitting is assigned to new partition F1, and a second data group "50, 56" is assigned to new partition F2. In this case, the merging condition is satisfied, and a merging task is triggered to merge the second data group "1, 3, 19, 25" in new partition F1 obtained in the first round of splitting with the second data group "83, 67, 101, 103" in new partition F1 obtained in the second round of splitting, to obtain a target file including "1, 3, 19, 25, 83, 67, 101, 103". Similarly, the second data group "8, 12, 16, 28" in new partition F2 obtained in the first round of splitting can be merged with the second data group "50, 56" in new partition F2 obtained in the second round of splitting, to obtain a target file including "8, 12, 16, 28, 50, 56". Then, the third round of splitting process is performed.

In the third round of splitting process, based on the splitting rule, a second data group "117, 135, 167" obtained after splitting is assigned to new partition F1, and a second data group "110, 126" is assigned to new partition F2. In this case, the merging condition is satisfied, and a merging task is triggered, to merge the target file in new partition F1 obtained in the second round of splitting and through merging with the second data group "117, 135, 167" in new partition F1 obtained in the third round of splitting, to obtain a new target file including "1, 3, 19, 25, 83, 67, 101, 103, 117, 135, 167". Similarly, the target file in new partition F2 obtained in the second round of splitting and through merging can be merged with the second data group "110, 126" in new partition F2 obtained in the third round of splitting, to obtain a new target file including "8, 12, 16, 28, 50, 56, 110, 126", so as to complete the splitting process.

Optionally, in the three rounds of splitting processes, every time a round of splitting is completed, a target splitting data group that has been split can be deleted from a corresponding target source partition to release space resources occupied by this part of data and save disk spaces.

It can be understood that in the sstable file, data is usually stored orderly in a format of a key-value pair, and is divided into a series of data blocks. Therefore, the baseline data and the dump data each include a plurality of data blocks, and each data block includes a plurality of data entries. A specific format of the data entry depends on a storage format of a specific database. For example, in the OceanBase database, one piece of row data is one data entry. In this case, in an implementation method, the performing merging processing on target data in the new partition can include: creating a target file in the new partition, determining whether there is an intersection between data blocks included in the target data, and if yes, successively iterating the data entries in each data block in each of the baseline data and the dump data into the target file, and in the iteration process, fusing data entries having an intersection into a new data entry and then putting the data entry into the target file, or if no, directly putting all the data blocks included in the baseline data into the target file, and successively iterating data entries in the dump data into the target file. That is, in this case, the data block included in the baseline data can be directly reused, and there is no need to perform iteration, thereby saving a large quantity of CPU and IO resources, greatly saving resources required for partition splitting, and improving splitting performance.

In the previous merging process, the determining whether there is an intersection between data blocks includes: determining whether there is an overlap between data ranges corresponding to the data blocks. For example, the data entry is row data and includes two columns, where the first column is a primary key, and the second column is a value corresponding to the primary key. Assume that a certain data block in the baseline data and a certain data block in the dump data have same data entries, that is, data entries with the same primary key. It indicates that there is an intersection between the data entries in the two data blocks, that is, there is an intersection between the two data blocks. The data entries having an intersection need to be fused, that is, data that is most recently written into the data entries is retained, and corresponding old data is removed, to form a new data entry through merging.

For example, each data entry is a piece of row data, and includes three columns. The first column is a primary key, the second column is a first parameter value, and the third column is a second parameter value. Two data entries having an intersection exist: (1, a, b) and (1, a'). That is, a primary key of each of the data entries is 1, a first parameter value of the former is a and a second parameter value is b, and a first parameter value of the latter is a' and a second parameter value is null. Assume that the former data entry is written before the latter data entry. A new data entry obtained through merging is (1, a', b).

The OceanBase database is used as an example. The sstable file includes a plurality of macroblocks. Each macroblock includes a plurality of rows of sorted data. In this case, the target data includes the dump sstable in the new partition, the baseline sstable obtained in the current round of splitting, and the baseline sstable obtained in the previous round of splitting and through merging, and the data files need to be merged into a new baseline sstable. In the merging process, all row data is iterated when the dump sstable is iterated. When the baseline sstable is iterated, there is no need to iterate all row data. Under some conditions, a macroblock can be directly reused. If there is no intersection between the macroblocks in the baseline sstable included in the target data and there is no intersection between data in the baseline sstable and data in the dump sstable, the macroblock in the baseline sstable can be directly reused, that is, put into the target file, that is, the new baseline sstable. If there is an intersection between the macroblocks in the baseline sstable included in the target data, or there is an intersection between data in the baseline sstable and data in the dump sstable, row data in the macroblock needs to be iterated. If the same row data exists in a plurality of tables, the row data needs to be fused to obtain new row data, and then the new row data is written into the target file, that is, a macroblock in the new baseline sstable.

In addition, it can be understood that when the first data file is a baseline data file in the target source partition, that is, a baseline sstable file, in addition to the first data file, a second data file is further stored in the target source partition. The second data file is a data file whose data volume does not exceed the previous predetermined value, and the data volume of the second data file is less than the data volume of the first data file. Correspondingly, the partition splitting method provided in this implementation can further include step S203 of performing a second splitting step on the second data file to split the second data file into the at least two new partitions. The second splitting step can include: splitting the second data file into a plurality of third data groups based on the predetermined splitting rule, where each third data group corresponds to one new partition, and assigning each third data group to the new partition corresponding to the third data group.

It is worthwhile to note that step S203 can be performed before step S202, or can be performed after step S202, or can be performed basically at the same time as step S202.

In an implementation method of this implementation, the second data file can include a dump sstable file. After the dump sstable file is split, whether a corresponding new partition satisfies a dump condition can be determined, and a new partition that satisfies the dump condition is dumped. In this case, the dump data in the previous target data can include data obtained by splitting the second data file and/or data obtained by performing freezing and dump processing on new data written into the new partition.

In addition, in another implementation method of this implementation, the second data file can include a dump sstable file and a frozen memtable data block. In this case, the previous second splitting step needs to be separately performed on the dump sstable file and the frozen memtable data block, to split the dump sstable file and split the frozen memtable data block.

In this implementation, step S202 and step S203 are a process of performing physical splitting for a new partition. It can be understood that, to help a user normally perform a query operation in the partition splitting process, in an implementation of the present application, before physical splitting is performed for a new partition, logical splitting further needs to be performed. That is, before the before the performing the first splitting step on the first data file, the method further includes: creating a reference file in each new partition for each data file stored in the target source partition, where each reference file is used to reference a corresponding data file.

After the new partitions are created for the target source partition, a memtable in an old partition needs to be frozen, a reference file needs to be created, and all sstables and frozen memtables in the target source partition are referenced. In this case, after the assigning each second data group to the new partition corresponding to the second data group, the method further includes: deleting the reference file from the new partition after a data file corresponding to the reference file is split. For a specific process, references can be made to the corresponding descriptions in the first aspect.

It is worthwhile to note that, after logical splitting is completed for a new partition and before physical splitting is performed for the new partition, when a query request of the user is received and some data in the new partition needs to be queried, a new memtable in the new partition and a table referenced in the target source partition need to be queried. In this case, data that does not belong to the partition can be identified. Therefore, the identified data needs to be filtered. For a specific filtering process, references can be made to the corresponding descriptions in the implementation provided in the first aspect.

Optionally, in an implementation of the present application, before the performing a first splitting step on the first data file to split the first data file into the at least two new partitions, the method further includes: determining whether the target source partition satisfies a predetermined dump condition, and if yes, performing dump processing on data in the target source partition, and after the target source partition is dumped, updating a reference file in each new partition corresponding to the target source partition. If the target source partition does not satisfy the predetermined dump condition, a corresponding physical splitting process is performed. After dump, the frozen memtable and a plurality of dump sstables in the target source partition are merged into one dump sstable. Because the data file in the target source partition changes, after the target source partition is dumped, reference of a table in a new partition corresponding to the target source partition needs to be updated before subsequent physical splitting can be performed for the new partition. The target source partition is first dumped and then the physical splitting process is performed, so that memory space resources are released timely.

In a specific application scenario of this implementation of the present application, a freezing task, a dump task, and a merging task are triggered inside the database system based on memory usage or through timing, or certainly, can be manually triggered. When a trigger command is received, all partitions in the system are sequentially scanned. A partition that satisfies a freezing condition is frozen, and whether physical splitting needs to be performed is determined, that is, whether the partition is a new partition completed by logical splitting is determined. For a partition that does not need logical splitting, dump task and merging task are directly triggered. For a partition that needs logical splitting, the previous physical splitting process is performed. Before physical splitting is performed for the partition, whether a target source partition corresponding to the partition needs to be dumped is first determined. If yes, the target source partition is first dumped, and logical reference in a corresponding new partition is updated after dump, so that the previous physical splitting process is performed on the partition.

In this case, a frozen memtable in the target source partition is not referenced in the partition. That is, in the physical splitting process, a referenced dump sstable and a referenced baseline sstable need to be separately split. First, data in the dump sstable is iterated and is split based on the splitting rule. After the data in the dump sstable in the target source partition is all split into a corresponding new partition, dump processing can be performed on the new partition, that is, when the new partition satisfies the dump condition, the new partition is dumped. After the dump sstable is split, the previous progressive splitting is performed on the referenced baseline sstable, and after each round of splitting is completed, merging processing is performed on a corresponding new partition, until the progressive splitting of the baseline sstable and merging of the new partition are completed.

In the partition splitting method provided in this implementation of the present application, the first data file in the partition using the LSM tree structure is split in a plurality of rounds, and resource consumption of partition splitting is distributed to a plurality of time periods, thereby effectively saving CPU resources, IO resources, disk space resources, etc. that are occupied in the same time period in a splitting process. In addition, the splitting occasion and the merging occasion can be well coordinated, thereby effectively avoiding an impact of introduction of partition splitting on an online service. In addition, in a process of merging partition data, a method for reusing a data block is used, thereby further saving a large quantity of CPU and IO resources, greatly reducing resources required for partition splitting, and improving splitting performance. In addition, an application range is wide, and the method can be applied to a plurality of types of partitions, such as a range partition, a hash partition, and a list partition.

Figure 5:
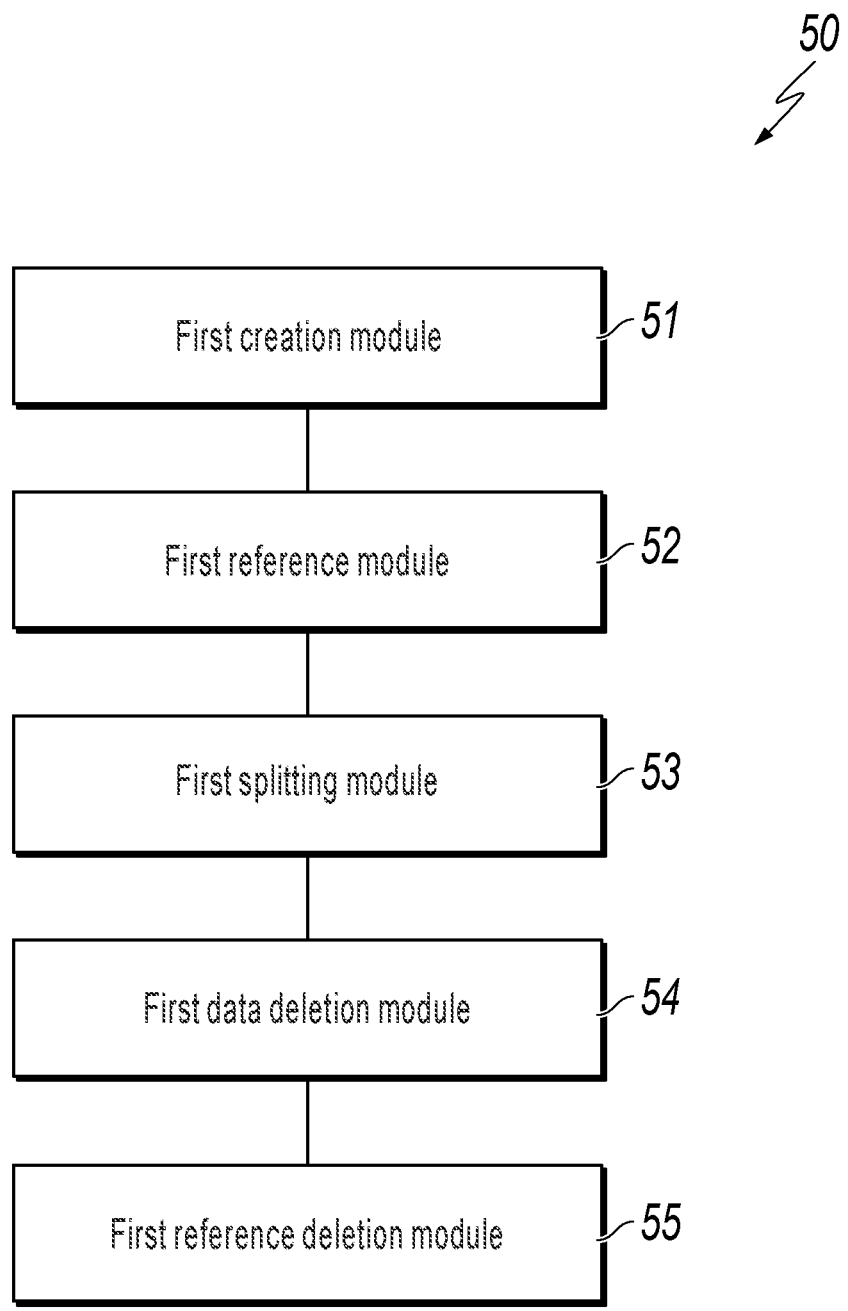
FIG. 5 is a block diagram illustrating modules of a partition splitting apparatus, according to a third aspect of the implementations of the present application.

According to a third aspect, based on the same concept as the partition splitting method provided in the implementation of the first aspect, an implementation of the present application further provides a partition splitting apparatus. Referring to FIG. 5, the partition splitting apparatus 50 includes: a first creation module 51, configured to create at least two new partitions for a target source partition, and a first splitting module 53, configured to divide data files in the target source partition into at least two data groups, select one data group from the at least two data groups as a target splitting data group to perform a splitting step on the target splitting data group, and after the target splitting data group is split, select, as a target splitting data group, another data group from data groups other than the data group that has already been split, until the at least two data groups are all split, where the splitting step includes: splitting the target splitting data group into a plurality of data sub-groups based on a predetermined splitting rule, where each data sub-group corresponds to one new partition, and assigning each data sub-group to the new partition corresponding to the data sub-group.

In an optional implementation, the partition splitting apparatus 50 can further include a first data deletion module 54, configured to delete a target splitting data group that is split from the target source partition.

In an optional implementation, the partition splitting apparatus 50 can further include: a first reference module 52, configured to create a reference file in each new partition for a data file stored in the target source partition, where the reference file is used to reference the data file, and a first reference deletion module 55, configured to delete the reference file from the new partition after data corresponding to the reference file is all split.

It is worthwhile to note that, the partition splitting apparatus 50 provided in the present application, where detailed methods for executing each module are descried in the implementations provided in the first aspect, further explanation is omitted.

Figure 6:
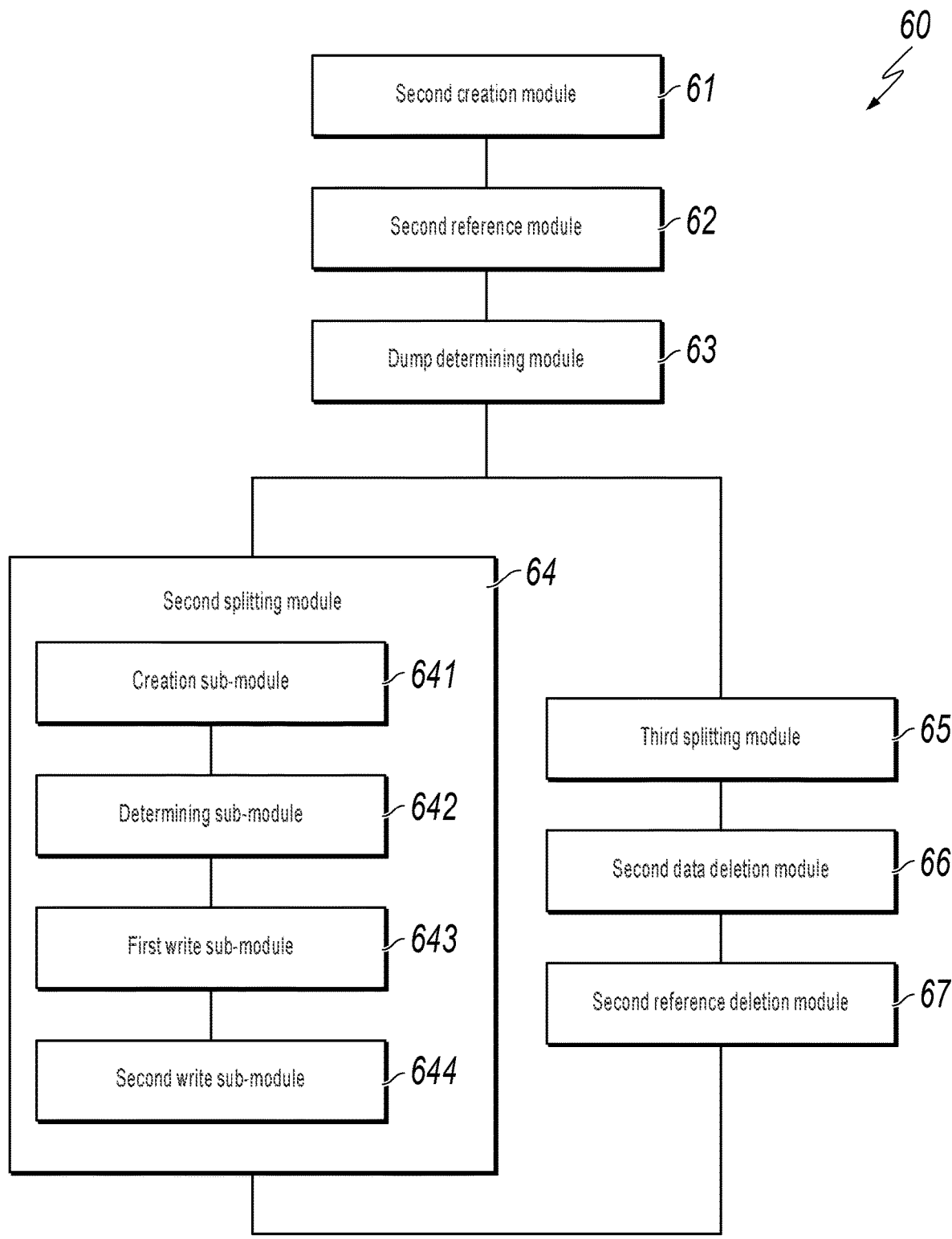
FIG. 6 is a block diagram illustrating modules of a partition splitting apparatus, according to a fourth aspect of the implementations of the present application.

According to a fourth aspect, based on the same concept as the partition splitting method provided in the implementation of the second aspect, an implementation of the present application further provides a partition splitting apparatus, applied to a database system using an LSM tree. Referring to FIG. 6, the partition splitting apparatus 60 includes: a second creation module 61, configured to create at least two new partitions for a target source partition, where a first data file is stored in the target source partition, and the first data file is a data file whose data volume exceeds a predetermined value, and a second splitting module 64, configured to perform a first splitting step on the first data file to split the first data file into the at least two new partitions, where the first splitting step includes: dividing the first data file into at least two first data groups, and selecting one first data group from the at least two first data groups as a target splitting data group, splitting the target splitting data group into a plurality of second data groups based on a predetermined splitting rule, where each second data group corresponds to one new partition, assigning each second data group to the new partition corresponding to the second data group, and performing merging processing on target data in the new partition, and selecting, as a target splitting data group, another first data group from first data groups other than the first data group that has already been split, until the at least two first data groups are all split.

In an optional implementation, a second data file is further stored in the target source partition, and the second data file is a data file whose data volume does not exceed the predetermined value. In this case, the partition splitting apparatus 60 can further include: a third splitting module 65, configured to perform a second splitting step on the second data file to split the second data file into the at least two new partitions, where the second splitting step includes: splitting the second data file into a plurality of third data groups based on the predetermined splitting rule, where each third data group corresponds to one new partition, and assigning each third data group to the new partition corresponding to the third data group.

In an optional implementation, the first data file is a baseline data file. In this case, the target data can include baseline data and dump data in the new partition. The baseline data includes data obtained by splitting a current target splitting data group and data obtained by splitting a previous target splitting data group and through merging. The dump data includes data obtained by splitting a dump data file in the target source partition and/or data obtained by performing freezing and dump processing on new data written into the new partition.

In an optional implementation, the target data includes baseline data and dump data in the new partition, the baseline data and the dump data each include a plurality of data blocks, each data block includes a plurality of data entries. In this case, the second splitting module 64 can include: a creation sub-module 641, configured to create a target file in the new partition, a determining sub-module 642, configured to determine whether there is an intersection between data blocks included in the target data, a first write sub-module 643, configured to: when the determining sub-module 642 determines that there is no intersection, directly put all the data blocks included in the baseline data into the target file, and successively iterate data entries in the dump data into the target file, and a second write sub-module 644, configured to: when the determining sub-module 642 determines that there is an intersection, successively iterate the data entries in each data block in each of the baseline data and the dump data into the target file, and in the iteration process, fuse data entries having an intersection into a new data entry and then put the data entry into the target file.

In an optional implementation, the partition splitting apparatus 60 can further include a second data deletion module 66, configured to delete a target splitting data group that is split from the target source partition.

In an optional implementation, the partition splitting apparatus 60 can further include: a second reference module 62, configured to create a reference file in each new partition for each data file stored in the target source partition, where each reference file is used to reference a corresponding data file, and a second reference deletion module 67, configured to delete the reference file from the new partition after a data file corresponding to the reference file is split.

In an optional implementation, the partition splitting apparatus 60 can further include a dump determining module 63, configured to determine whether the target source partition satisfies a predetermined dump condition, and if yes, perform dump processing on data in the target source partition, and after the target source partition is dumped, update a reference file in each new partition corresponding to the target source partition.

It is worthwhile to note that, the partition splitting apparatus 60 provided in the present application, where detailed methods for executing each module are described in the implementations provided in the second aspect, further explanation is omitted.

According to a fifth aspect, based on the same concept as the partition splitting method provided in the previous implementation, an implementation of the present application further provides an electronic device, including a memory, one or more processors, and a computer program that is stored in the memory and that can run on the processor. When executing the program, the processor implements the steps of the partition splitting method provided in the first aspect or the steps of the partition splitting method provided in the second aspect.

Figure 7:
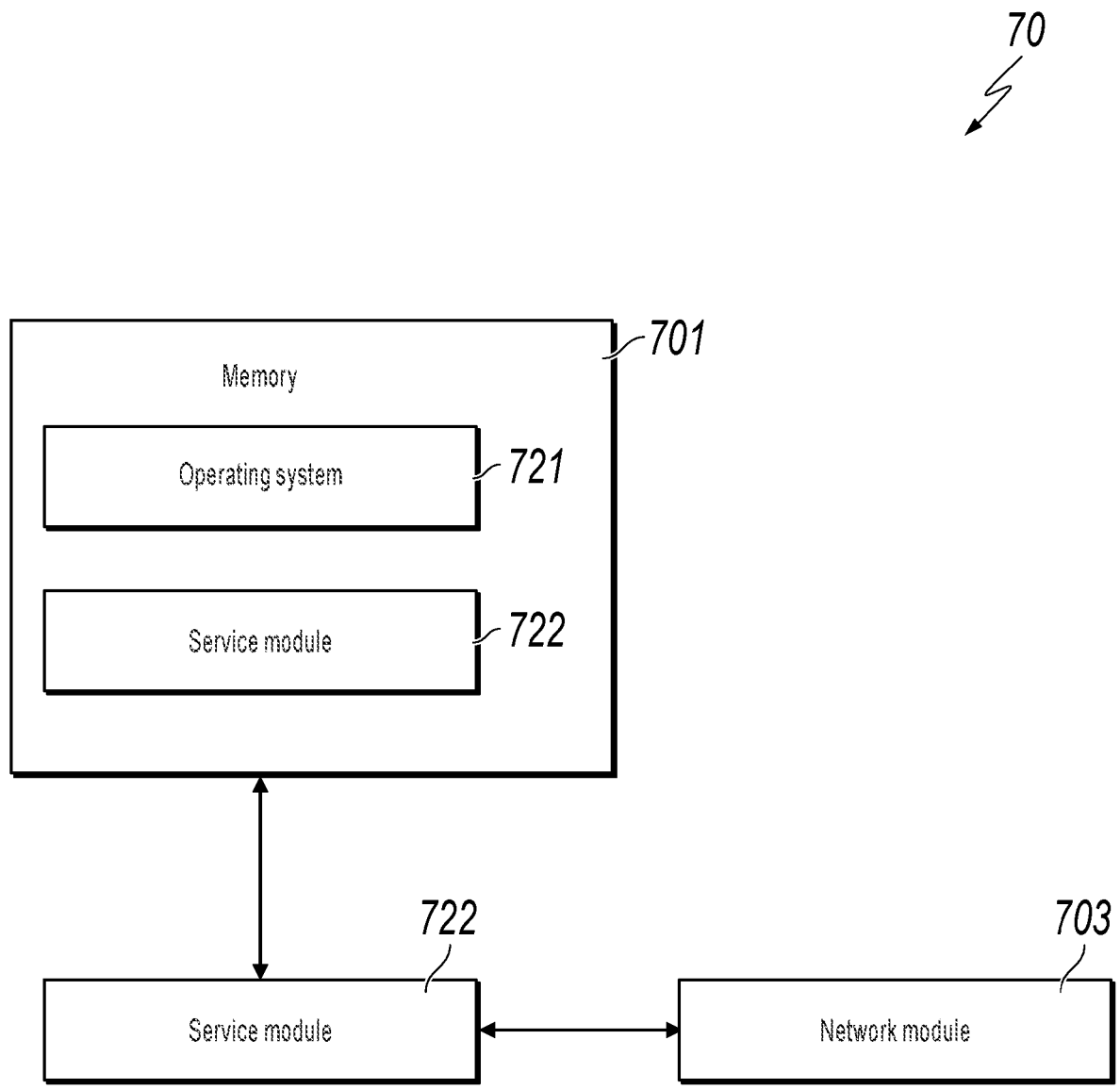
FIG. 7 is a schematic structural diagram illustrating a storage server, according to a fifth aspect of the implementations of the present application.

FIG. 7 is a structural block diagram illustrating a storage server that can be applied to an implementation of the present application. As shown in FIG. 7, the storage server 70 includes a memory 701, a processor 702, and a network module 703.

The memory 701 can be configured to store a software program and a module, for example, a program instruction/module and a data file that correspond to the partition splitting method and apparatus in the implementations of the present application. The processor 702 performs various function applications and processes data by running the software program and the module that are stored in the memory 701, to implement the partition splitting method in the implementations of the present application. The memory 701 can include a high-speed random access memory, and can further include a nonvolatile memory, such as one or more magnetic storage apparatuses, a flash memory, or another nonvolatile solid-state memory. Further, the software program and the module in the memory 701 can further include an operating system 721 and a service module 722. The operating system 721 can be, for example, LINUX, UNIX, and WINDOWS, can include various software components and/or drivers used to manage system tasks (for example, memory management, storage device control, and power management), and can communicate with various hardware or software components, to provide a running environment of another software component. The service module 722 runs on the operating system 721, listens to a request from a network by using a network service of the operating system 721, completes corresponding data processing based on the request, and returns a processing result to a client. That is, the service module 722 is configured to provide a network service for the client.

The network module 703 is configured to receive and send a network signal. The network signal can include a wireless signal or a wired signal.

The storage server 70 in this implementation of the present application is a storage server in a database system. It can be understood that the structure shown in FIG. 7 is only an example, and the storage server 70 can further include more or fewer components than those shown in FIG. 7, or have a configuration different from that shown in FIG. 7. The components shown in FIG. 7 can be implemented by using hardware, software, or a combination of hardware and software.

According to a sixth aspect, based on the same concept as the partition splitting method provided in the previous implementation, an implementation of the present application further provides a computer-readable storage medium. The computer-readable storage medium stores a computer program, and the program is executed by a processor to implement the steps of the partition splitting method provided in the first aspect or the partition splitting method provided in the second aspect.

The present application is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of other programmable data processing devices generate a device for implementing a specific function in one or more processes in the flowcharts and/or in one or more blocks in the block diagrams.

These computer program instructions can be stored in a computer-readable memory that can instruct the computer or other programmable data processing devices to work in a specific way, so that the instructions stored in the computer-readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

Although some implementations of the present application were described, a person skilled in the art can make changes and modifications to these implementations once the person skilled in the art learns the basic concept. Therefore, the following claims are intended to be construed as to cover the implementations and all changes and modifications falling within the scope of the present application.

Apparently, a person skilled in the art can make various modifications and variations to the present application without departing from the spirit and scope of the present application. The present application is intended to cover these modifications and variations of the present application provided that they fall within the scope of protection defined by the following claims and their equivalent technologies.

What is claimed is:

1. A computer-implemented method, comprising:
    dividing data files in a target source partition into at least two data groups, wherein the data files are stored by a database system using a log-structured merge (LSM) tree and a first data file of the data files is stored in the target source partition, and the first data file includes first data of a volume that exceeds a predetermined value;
    selecting a first data group from the at least two data groups as a target splitting data group;
    performing a first splitting step on the target splitting data group, wherein the first splitting step comprises:
        splitting the target splitting data group into a plurality of data sub-groups based on a predetermined splitting rule, wherein each data sub-group of the plurality of data sub-groups corresponds to a new partition of at least two new partitions for the target source partition, and
        assigning each data sub-group to the new partition corresponding to the data sub-group;
    selecting, as the target splitting data group, a second data group from the at least two data groups, the second data group being different from the first data group; and
    performing merging processing on target data in the new partition, wherein the target data comprises baseline data and dump data in the new partition, the baseline data and the dump data each comprises a plurality of data blocks, each data block comprises a plurality of data entries, and performing the merging processing on the target data in the new partition comprises:
        creating a target file in the new partition,
        determining whether there is an intersection between data blocks comprised in the target data,
        in response to determining that there is no intersection between the data blocks comprised in the target data, directly putting all the data blocks comprised in the baseline data into the target file, and successively iterating data entries in the dump data into the target file, and
        in response to determining that there is an intersection between the data blocks comprised in the target data, successively iterating the data entries in each data block in each of the baseline data and the dump data into the target file, and in an iteration process, fusing data entries having an intersection into a new data entry and then putting the data entry into the target file.

2. The computer-implemented method of claim 1, further comprising:
    after assigning each data sub-group to the new partition corresponding to the data sub-group, deleting a target splitting data group that is split from the target source partition.

3. The computer-implemented method of claim 1, further comprising:
    before dividing the data files in the target source partition into at least two data groups, creating a reference file in each new partition of the at least two new partitions for one of the data files stored in the target source partition, wherein the reference file is used to reference the one of the data files; and after the assigning each data sub-group to the new partition corresponding to the data sub-group, deleting the reference file from the new partition after data corresponding to the reference file is all split.

4. The computer-implemented method of claim 1, wherein a second data file is further stored in the target source partition, the second data file comprises second data with a volume that does not exceed the predetermined value, and the method further comprises:

performing a second splitting step on the second data file to split the second data file into the at least two new partitions, wherein the second splitting step comprises:
splitting the second data file into a plurality of third data groups based on the predetermined splitting rule, wherein each third data group corresponds to a new partition among the at least two new partitions; and
assigning each third data group to the new partition corresponding to the third data group.

5. The computer-implemented method of claim 1, wherein the first data file is a baseline data file, and the target data comprises baseline data and dump data in the new partition, and the baseline data comprises data obtained by splitting a current target splitting data group and data obtained by splitting a previous target splitting data group and through merging, and the dump data comprises data obtained by splitting a dump data file in the target source partition and/or data obtained by performing freezing and dump processing on new data written into the new partition.

6. The computer-implemented method of claim 1, further comprising:

after assigning each second data group to the new partition corresponding to the second data group, deleting a target splitting data group that is split from the target source partition.

7. The computer-implemented method of claim 1, further comprising:

before performing the splitting step on the first data file, creating a reference file in each new partition for each data file stored in the target source partition, wherein each reference file is used to reference a corresponding data file; and after assigning each second data group to the new partition corresponding to the second data group, deleting the reference file from the new partition after a data file corresponding to the reference file is split.

8. The computer-implemented method of claim 7, further comprising:

before performing the splitting step on the first data file to split the first data file into the at least two new partitions, determining whether the target source partition satisfies a predetermined dump condition;

in response to determining that the target source partition satisfies the predetermined dump condition, performing dump processing on data in the target source partition; and after the target source partition is dumped, updating a reference file in each new partition corresponding to the target source partition.

9. A non-transitory, computer-readable medium storing one or more instructions executable by a computer system to perform operations comprising:

dividing data files in a target source partition into at least two data groups, wherein the data files are stored by a database system using a log-structured merge (LSM) tree and a first data file of the data files is stored in the target source partition, and the first data file includes first data of a volume that exceeds a predetermined value;

selecting a first data group from the at least two data groups as a target splitting data group;

performing a first splitting step on the target splitting data group, wherein the first splitting step comprises:
splitting the target splitting data group into a plurality of data sub-groups based on a predetermined splitting rule, wherein each data sub-group of the plurality of data sub-groups corresponds to a new partition of at least two new partitions for the target source partition, and
assigning each data sub-group to the new partition corresponding to the data sub-group;

selecting, as the target splitting data group, a second data group from the at least two data groups, the second data group being different from the first data group; and performing merging processing on target data in the new partition, wherein the target data comprises baseline data and dump data in the new partition, the baseline data and the dump data each comprises a plurality of data blocks, each data block comprises a plurality of data entries, and performing the merging processing on the target data in the new partition comprises:
creating a target file in the new partition,
determining whether there is an intersection between data blocks comprised in the target data,
in response to determining that there is no intersection between the data blocks comprised in the target data, directly putting all the data blocks comprised in the baseline data into the target file, and successively iterating data entries in the dump data into the target file, and
in response to determining that there is an intersection between the data blocks comprised in the target data, successively iterating the data entries in each data block in each of the baseline data and the dump data into the target file, and in an iteration process, fusing data entries having an intersection into a new data entry and then putting the data entry into the target file.

10. The non-transitory, computer-readable medium of claim 9, wherein the operations further comprise:

after assigning each data sub-group to the new partition corresponding to the data sub-group, deleting a target splitting data group that is split from the target source partition.

11. The non-transitory, computer-readable medium of claim 9, wherein the operations further comprise:

before dividing the data files in the target source partition into at least two data groups, creating a reference file in each new partition of the at least two new partitions for one of the data files stored in the target source partition, wherein the reference file is used to reference the one of the data files; and after the assigning each data sub-group to the new partition corresponding to the data sub-group, deleting the reference file from the new partition after data corresponding to the reference file is all split.

12. The non-transitory, computer-readable medium of claim 9, wherein a second data file is further stored in the target source partition, the second data file comprises second data with a volume that does not exceed the predetermined value, and wherein the operations further comprise:

performing a second splitting step on the second data file to split the second data file into the at least two new partitions, wherein the second splitting step comprises: splitting the second data file into a plurality of third data groups based on the predetermined splitting rule, wherein each third data group corresponds to a new partition among the at least two new partitions; and assigning each third data group to the new partition corresponding to the third data group.

13. The non-transitory, computer-readable medium of claim 9, wherein the first data file is a baseline data file, and the target data comprises baseline data and dump data in the new partition, and the baseline data comprises data obtained by splitting a current target splitting data group and data obtained by splitting a previous target splitting data group and through merging, and the dump data comprises data obtained by splitting a dump data file in the target source partition and/or data obtained by performing freezing and dump processing on new data written into the new partition.

14. The non-transitory, computer-readable medium of claim 9, wherein the operations further comprise:
after assigning each second data group to the new partition corresponding to the second data group, deleting a target splitting data group that is split from the target source partition.

15. The non-transitory, computer-readable medium of claim 9, wherein the operations further comprise:
before performing the splitting step on the first data file, creating a reference file in each new partition for each data file stored in the target source partition, wherein each reference file is used to reference a corresponding data file; and
after assigning each second data group to the new partition corresponding to the second data group, deleting the reference file from the new partition after a data file corresponding to the reference file is split.

16. The non-transitory, computer-readable medium of claim 15, wherein the operations further comprise:
before performing the splitting step on the first data file to split the first data file into the at least two new partitions, determining whether the target source partition satisfies a predetermined dump condition;
in response to determining that the target source partition satisfies the predetermined dump condition, performing dump processing on data in the target source partition; and
after the target source partition is dumped, updating a reference file in each new partition corresponding to the target source partition.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
dividing data files in a target source partition into at least two data groups, wherein the data files are stored by a database system using a log-structured merge (LSM) tree and a first data file of the data files is stored in the target source partition, and the first data file includes first data of a volume that exceeds a predetermined value,
selecting a first data group from the at least two data groups as a target splitting data group,
performing a first splitting step on the target splitting data group, wherein the first splitting step comprises:
splitting the target splitting data group into a plurality of data sub-groups based on a predetermined splitting rule, wherein each data sub-group of the plurality of data sub-groups corresponds to a new partition of at least two new partitions for the target source partition, and
assigning each data sub-group to the new partition corresponding to the data sub-group,
selecting, as the target splitting data group, a second data group from the at least two data groups, the second data group being different from the first data group, and
performing merging processing on target data in the new partition, wherein the target data comprises baseline data and dump data in the new partition, the baseline data and the dump data each comprises a plurality of data blocks, each data block comprises a plurality of data entries, and performing the merging processing on the target data in the new partition comprises:
creating a target file in the new partition,
determining whether there is an intersection between data blocks comprised in the target data,
in response to determining that there is no intersection between the data blocks comprised in the target data, directly putting all the data blocks comprised in the baseline data into the target file, and successively iterating data entries in the dump data into the target file, and
in response to determining that there is an intersection between the data blocks comprised in the target data, successively iterating the data entries in each data block in each of the baseline data and the dump data into the target file, and in an iteration process, fusing data entries having an intersection into a new data entry and then putting the data entry into the target file.

18. The computer-implemented system of claim 17, wherein the operations further comprise:
after assigning each data sub-group to the new partition corresponding to the data sub-group, deleting a target splitting data group that is split from the target source partition.

19. The computer-implemented system of claim 17, wherein the operations further comprise:
before dividing the data files in the target source partition into at least two data groups, creating a reference file in each new partition of the at least two new partitions for one of the data files stored in the target source partition, wherein the reference file is used to reference the one of the data files; and
after the assigning each data sub-group to the new partition corresponding to the data sub-group, deleting the reference file from the new partition after data corresponding to the reference file is all split.

20. The computer-implemented system of claim 17, wherein a second data file is further stored in the target source partition, the second data file comprises second data with a volume that does not exceed the predetermined value, and wherein the operations further comprise:
performing a second splitting step on the second data file to split the second data file into the at least two new partitions, wherein the second splitting step comprises:
splitting the second data file into a plurality of third data groups based on the predetermined splitting rule, wherein each third data group corresponds to a new partition among the at least two new partitions; and assigning each third data group to the new partition corresponding to the third data group.

21. The computer-implemented system of claim 17, wherein the first data file is a baseline data file, and the target data comprises baseline data and dump data in the new partition, and the baseline data comprises data obtained by splitting a current target splitting data group and data obtained by splitting a previous target splitting data group and through merging, and the dump data comprises data obtained by splitting a dump data file in the target source partition and/or data obtained by performing freezing and dump processing on new data written into the new partition.

22. The computer-implemented system of claim 17, wherein the operations further comprise:

after assigning each second data group to the new partition corresponding to the second data group, deleting a target splitting data group that is split from the target source partition.

23. The computer-implemented system of claim 17, wherein the operations further comprise:

before performing the splitting step on the first data file, creating a reference file in each new partition for each data file stored in the target source partition, wherein each reference file is used to reference a corresponding data file; and after assigning each second data group to the new partition corresponding to the second data group, deleting the reference file from the new partition after a data file corresponding to the reference file is split.

24. The computer-implemented system of claim 23, wherein the operations further comprise:

before performing the splitting step on the first data file to split the first data file into the at least two new partitions, determining whether the target source partition satisfies a predetermined dump condition;

in response to determining that the target source partition satisfies the predetermined dump condition, performing dump processing on data in the target source partition; and after the target source partition is dumped, updating a reference file in each new partition corresponding to the target source partition.

\* \* \* \* \*